US012450588B2

United States Patent
Leong et al.

(10) Patent No.: US 12,450,588 B2
(45) Date of Patent: Oct. 21, 2025

(54) METHOD FOR PROCESSING A SECURE FINANCIAL TRANSACTION USING A COMMERCIAL OFF-THE-SHELF OR AN INTERNET OF THINGS DEVICE

(71) Applicants: Christopher Yew Chong Leong, Kuala Lumpur (MY); Joel Jin Ghee Tay, Kuala Lumpur (MY); Chee Ming Lim, Kuala Lumpur (MY); Kar Hou Kon, Kuala Lumpur (MY)

(72) Inventors: Christopher Yew Chong Leong, Kuala Lumpur (MY); Joel Jin Ghee Tay, Kuala Lumpur (MY); Chee Ming Lim, Kuala Lumpur (MY); Kar Hou Kon, Kuala Lumpur (MY)

(*) Notice: Subject to any disclaimer, the term of this patent is extended or adjusted under 35 U.S.C. 154(b) by 0 days.

(21) Appl. No.: 17/058,061

(22) PCT Filed: May 24, 2019

(86) PCT No.: PCT/MY2019/050032
§ 371 (c)(1),
(2) Date: Nov. 23, 2020

(87) PCT Pub. No.: WO2019/226042
PCT Pub. Date: Nov. 28, 2019

(65) Prior Publication Data
US 2021/0209579 A1 Jul. 8, 2021

(30) Foreign Application Priority Data
May 24, 2018 (MY) .......................... PI 2018702015

(51) Int. Cl.
*G06Q 20/32* (2012.01)
*G06F 9/451* (2018.01)
(Continued)

(52) U.S. Cl.
CPC ....... *G06Q 20/3226* (2013.01); *G06Q 20/308* (2020.05); *G06Q 20/321* (2020.05);
(Continued)

(58) Field of Classification Search
CPC ............ G06Q 20/3226; G06Q 20/308; G06Q 20/321; G06Q 20/3278; G06Q 20/4016;
(Continued)

(56) References Cited

U.S. PATENT DOCUMENTS 9,608,829 B2 3/2017 Spanos
9,818,092 B2 11/2017 Pennanen
(Continued)

FOREIGN PATENT DOCUMENTS

| CN | 106682897 A | * | 5/2017 | |
|---|---|---|---|---|
| DE | 102013201730 A1 | * | 8/2014 | ........... G01S 5/0045 |
| WO | 2017/187397 A1 | | 11/2017 | |

OTHER PUBLICATIONS

T. Halevi et al., "Secure Proximity Detection for NFC Devices Based on Ambient Sensor Data," 2012, Computer Security—ESORICS 2012, retrieved from: https://link.springer.com/content/pdf/10.1007%2F978-3-642-33167-1_22.pdf (Year: 2012).*
(Continued)

*Primary Examiner* — Jessica Lemieux
*Assistant Examiner* — Douglas W Pinsky
(74) *Attorney, Agent, or Firm* — Maschoff Brennan

(57) ABSTRACT

A system and method for processing a secure financial transaction using a Commercial off-the-shelf (COTS) or Internet of Things (IoT) device is provided. The method comprises requesting a Trusted Application Manager (TAM) to verify the COTS/IoT device identity and executing an application on a COTS/IoT device. Upon verification, TAM installs a Trusted Application (TA) in a Trusted Execution Environment (TEE) of the COTS/IoT Device. Further, ini-
(Continued)

tiating a resonance response when a tag is within a predetermined distance from the COTS/IoT device with TA installed, and receive the tag information from the tag. Finally, processing a secure financial transaction using the COTS/IoT device based on the received tag information by accessing the TEE. The COTS/IoT device includes a distributed ledger, and which comprises information corresponding to at least one of COTS/IoT device ownership, manufacture, and usage information.

5 Claims, 3 Drawing Sheets

(51) Int. Cl.
| | | |
|---|---|---|
| *G06F 16/23* | (2019.01) | |
| *G06F 21/53* | (2013.01) | |
| *G06Q 20/10* | (2012.01) | |
| *G06Q 20/30* | (2012.01) | |
| *G06Q 20/34* | (2012.01) | |
| *G06Q 20/36* | (2012.01) | |
| *G06Q 20/38* | (2012.01) | |
| *G06Q 20/40* | (2012.01) | |
| *G06Q 40/06* | (2012.01) | |
| *H04L 9/32* | (2006.01) | |
| *H04L 29/06* | (2006.01) | |
| *H04W 12/06* | (2021.01) | |
| *H04W 12/08* | (2021.01) | |
| *G06F 21/31* | (2013.01) | |
| *G06F 21/32* | (2013.01) | |
| *G06F 21/45* | (2013.01) | |
| *G06F 21/57* | (2013.01) | |
| *G06Q 40/02* | (2023.01) | |
| *H04W 4/14* | (2009.01) | |
| *H04W 12/062* | (2021.01) | |
| *H04W 12/72* | (2021.01) | |
| *H04W 60/00* | (2009.01) | |

(52) U.S. Cl.
CPC ..... *G06Q 20/3278* (2013.01); *G06Q 20/4016* (2013.01); *H04L 9/3234* (2013.01)

(58) Field of Classification Search
CPC ...... G06Q 20/02; G06Q 20/322; G06Q 20/20; G06Q 20/30; G06Q 20/326; G06Q 20/40; G06Q 20/409; G06Q 2220/00; H04L 9/3234; H04L 2209/38; H04L 2209/56; H04L 2209/805; H04L 9/3239; H04L 63/12; H04L 9/32; G06F 21/53; G06F 21/44; G06F 21/74; G06F 21/57; H04W 12/106; H04W 12/108; G06K 19/0723; G07G 1/009

See application file for complete search history.

(56) References Cited

U.S. PATENT DOCUMENTS

| | | | | |
|---|---|---|---|---|
| 2009/0288148 | A1 | 11/2009 | Headley | |
| 2011/0211699 | A1* | 9/2011 | Ma | H04L 9/0877 380/278 |
| 2012/0272603 | A1* | 11/2012 | Carbines | E04F 13/0892 52/748.1 |
| 2013/0314690 | A1* | 11/2013 | Jones | G01B 21/047 359/615 |
| 2015/0365791 | A1* | 12/2015 | Morgner | H04W 4/023 455/456.3 |
| 2016/0134660 | A1* | 5/2016 | Ponsini | H04L 63/20 726/1 |
| 2016/0253670 | A1* | 9/2016 | Kim | G06Q 20/38215 705/72 |
| 2017/0243193 | A1 | 8/2017 | Manian | |
| 2017/0270510 | A1* | 9/2017 | Kattimani | H04W 4/023 |
| 2017/0344407 | A1* | 11/2017 | Jeon | G06F 21/74 |
| 2018/0147552 | A1* | 5/2018 | Niazi | C12M 27/16 |
| 2018/0167198 | A1* | 6/2018 | Muller | G06F 21/44 |
| 2019/0058696 | A1* | 2/2019 | Bowman | H04L 9/0897 |
| 2019/0340481 | A1* | 11/2019 | Locke | G06Q 20/3278 |
| 2020/0050798 | A1* | 2/2020 | Jiang | H04L 9/3247 |
| 2020/0104109 | A1* | 4/2020 | Li | G06Q 20/40 |
| 2020/0136837 | A1* | 4/2020 | Phatigaraphong | H04L 63/123 |

OTHER PUBLICATIONS

Secure Technology Alliance (STA), Trusted Execution Environment (TEE) 101: A Primer, Version 1.0, Apr. 2018, retrieved from: https://www.securetechalliance.org/wp-content/uploads/TEE-101-White-Paper-FINAL2-April-2018.pdf (Year: 218).*
J. Lind et al., "Teechan: Payment Channels Using Trusted Execution Environments," Mar. 7, 2017, arXiv:1612.07766v2, retrieved from: https://www.cs.cornell.edu/people/egs/papers/teechan.pdf (Year: 2017).*
S. Drimer et al., "Keep Your Enemies Close: Distance Bounding Against Smarcard Relay Attacks," 2007, 16th USENIX Security Symposium, retrieved from: https://www.usenix.org/legacy/events/sec07/tech/drimer/drimer.pdf (Year: 2007).*
A. Francillon et al., "Relay Attacks on Passive Keyless Entry and Start Systems in Modern Cars," 2010, Cryptology ePrint Archive, Report 2010/332, 2010, retrieved from: https://eprint.iacr.org/2010/332.pdf (Year: 2010).*
L. Francis et al., "Practical Relay Attack on Contactless Transactions by Using NFC Mobile Phones," 2011, IACR Cryptology ePrint Archive. 2011. 618. 10.3233/978-1-61499-143-4-21, retrieved from: https://www.isg.rhul.ac.uk/~lishoy/RFIDSecAsia2012LishoyFrancis.pdf (Year: 2011).*
G. Hancke et al., "An RFID Distance Bounding Protocol," 2005, (Proceedings of IEEE/CreatNet SecureComm, pp. 67-73, Sep. 2005) (Year: 2005).*
F. Hammerle et al., "Contactless RFID tag measurements" (Bode 100 Application Note), 2017, retrieved from: https:// www.omicron-lab.com/fileadmin/assets/Bode_100/ApplicationNotes/RFID_Resonance_Frequency/App_Note_RFID_Resonance_Frequency_V3_1.pdf (Year: 2017).*
Global Platform, "Introduction to Trusted Execution Environments," May 15, 2018, (Year: 2018).*
Global Platform, "The Trusted Execution Environment" (white paper), Jun. 2015, retrieved from: https://globalplatform.org/wp-content/uploads/2018/04/GlobalPlatform_TEE_Whitepaper_2015.pdf (Year: 2015).*
NFC Forum, "Essentials for Successful NFC Mobile Ecosystems," Oct. 2008, retrieved from: https://members.nfc-forum.org/resources/white_papers/NFC_Forum_Mobile_NFC_Ecosystem_White_Paper.pdf (Year: 2008).*
J. Ekberg et al. (Trustonic), "Trusted Execution Environments on Mobile Devices," 2013, retrieved from: https://www.cs.helsinki.fi/group/secures/CCS-tutorial/tutorial-slides.pdf (Year: 2013).*
N. Asokan et al., "Mobile Trusted Computing," 2014, Proceedings of the IEEE, vol. 102, No. 8, Aug. 2014 retrieved from: https://ieeexplore.ieee.org/stamp/stamp.jsp?arnumber=6856168 (Year: 2014).*
Global Platform, "Global Platform Device Technology TEE System Architecture," Version 1.0, Dec. 2011, Document Reference: GPD_SPE_009 (Year: 2011).*
Global Platform, "Global Platform Device Technology TEE Client API Specification," Version 1.0, Jul. 2010, Document Reference: GPD_SPE_007 (Year: 2010).*

* cited by examiner

METHOD FOR PROCESSING A SECURE FINANCIAL TRANSACTION USING A COMMERCIAL OFF-THE-SHELF OR AN INTERNET OF THINGS DEVICE

BACKGROUND

Field of Invention

The subject matter in general relates to digital payments. More particularly, but not exclusively, the subject matter relates to a COTS/IoT device based secure financial payment acceptance method and a device thereof.

Discussion of Related Art

In the digital world with digital economy trends, user requirements for security are increasingly becoming demanding. New challenges arise, since modern systems are becoming more and more complex, open and connected. Traditional security technologies are no longer able to handle the security requirements of such architectures. This certainly is explained by latest trends to integrate trusted computing concepts into embedded systems.

Specifically, for a secured processing to take place on COTS/IoT devices, especially those involved with transfer of currencies, it is often lacking in terms of trust and identification. Various efforts have been made to tackle the issue of trust, non-tampered identification and when it involves currencies movement, the compliance perspective from governing bodies. However, most if not all the solutions proposed were mainly driven from a software protection point of view, which either involved external eco system to support, high cost and yet susceptible to be tampered.

In view of the forgoing problems there is a need for a new and/or improved technique to facilitate secure financial payment acceptance using COTS/IoT devices, without compromising on the terms of trust and identity of the COTS/IoT devices processing such transactions.

SUMMARY

Accordingly, an improved technique to overcome the above problems is needed. To fulfill this need, system and method for processing a secure financial transaction using a Commercial off-the-shelf (COTS) or Internet of Things (IoT) device is provided. The method comprises requesting a Secured Provisioning Manager (SPM) to verify the COTS/IoT device identity and executing the application on a COTS/IoT device. Upon verification, SPM installs a Trusted Application (TA) in a Trusted Environment (TE) of the COTS/IoT Device. Further, initiating a resonance response when a tag is within a predetermined distance from the COTS/IoT device with TA installed, and receive the tag information from the tag. Finally, processing a secure financial transaction using the COTS/IoT device based on the received tag information by accessing the TE.

In another embodiment, the COTS/IoT device includes a distributed ledger, and wherein the distributed ledger comprises information corresponding to at least one of COTS/IoT device ownership, manufacture, and usage information.

In yet another embodiment, the information corresponding to the COTS/IoT device in the distributed ledger is modified through the TE.

In yet another embodiment, the application is executed in the operating system of the COTS/IoT device.

In yet another embodiment, the Secured Provisioning Manager (SPM) is a remote system which verifies the identity of the COTS/IoT device and installs the TA in the TE of the COTS/IoT device.

In yet another embodiment, the resonance response is performed multiple times, and a distance of the tag from the COTS/IoT device is calculated for each of the multiple resonance responses.

In yet another embodiment, the secure financial transaction is initiated in an event a decrease in distance is identified in subsequent resonance responses using the COTS/IoT device.

In yet another embodiment, the resonance response to calculate the distance is implemented using one or more of light proximity, sound proximity or accelerator in order to determine the relative distance, for the payment processing to begin. The relative distance is configurable and is used for the purpose of fraud detection by ensuring the payment is initiated from a trusted/genuine payment card. The distance may be adjusted to accommodate changes to the guidelines pertaining to payment schemes at present and in future.

In yet another embodiment, a COTS/IoT device for processing a secure financial transaction is provided. The COTS/IoT device is configured to request using the operating system part of the processor, a Secure Provisioning Manager (SPM) to verify device identity and install a Trusted Application (TA) in a Trusted Environment (TE) of the COTS/IoT Device, Wherein the TE is isolated from the operating system of the COTS/IoT device and runs in parallel on a TE part of the processor. Further, execute an application on a COTS/IoT device. Further, initiate, using the operating system part of the processor, a resonance response when a tag is within a predetermined distance from the COTS/IoT device with TA installed, and receive the tag information from the tag. Finally process, using the TE part of the processor, a secure financial transaction using the COTS/IoT device based on the received tag information with secured PIN entry is performed. The COTS/IoT device further comprises a distributed ledger, and wherein the distributed ledger comprises information corresponding to at least one of COTS/IoT device ownership, manufacture, and usage information.

Other objects, features, and advantages of the present invention will become apparent from the following detailed description. It should be however understood that the detailed description and specific examples, while indicating preferred embodiments of the present invention, are given by way of illustration only and various modifications may naturally be performed without deviating from the present invention.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "A but not B," "B but not A," and "A and B," unless otherwise indicated.

It should be understood that the capabilities of the invention described in the present disclosure and elements shown in the figures may be implemented in various forms of hardware, firmware, software, non-transitory computer readable medium or combinations thereof.

The embodiments disclose techniques for secure financial transaction acceptance using a Commercial of-the-shelf (COTS) device or Internet of Things (IoT) device. For example, embodiments provide a COTS/IoT device for processing a secure financial transaction. The COTS/IoT device is configured to execute, using an operating system part of a processor, an application on a COTS/IoT device. Further, request using the OS part of the processor, a Secure Provisioning Manager (SPM) to verify and install a Trusted Application (TA) in a Trusted Environment (TE) of the COTS/IoT Device.

The TE of the COTS/IoT device is isolated from the OS environment of the COTS/IoT device and both run in parallel. Further, a resonance response is initiated when a tag is within a predetermined distance from the COTS/IoT device and the tag information is received from the tag. Further a secure financial transaction is processed using the COTS/IoT device based on the received tag information by accessing the TE part of the processor. The COTS/IoT device further comprises a distributed ledger, which comprises information corresponding to at least one of COTS/IoT device ownership, manufacture, and usage information.

Figure 1:
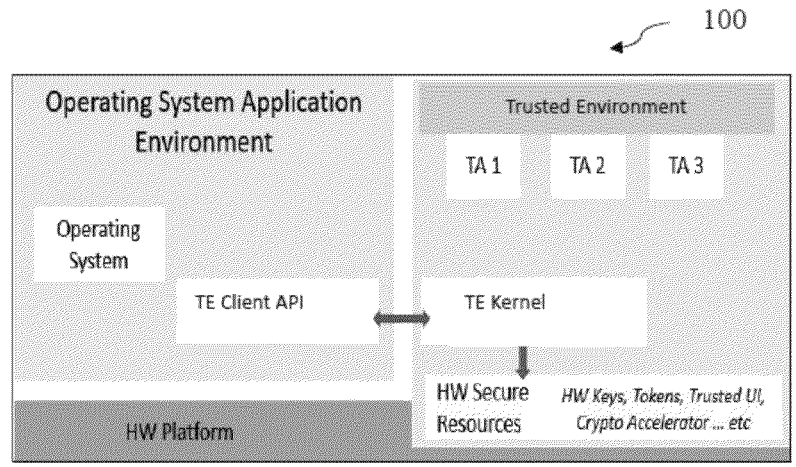
FIG. 1 is an exemplary simple architecture of a Trusted Environment (TE) system 100 used for secure financial transactions, in accordance with an embodiment of the invention.

FIG. 1 is an exemplary simple architecture of a Trusted Environment (TE) system 100 used for secure financial transactions, in accordance with an embodiment of the invention. As illustrated in the FIG. 1, the Operating System (OS) application environment and Trusted Environment (TE) co-exist in the COTS/IoT device. TE comprises a small secure kernel that shares the processor with OS application environment. Since both critical and non-critical applications run on COTS/IoT devices, such as mobile phones, laptops, and tablets, among other devices, the sensitive elements of the critical applications may be executed in TE in isolation from OS application environment. This facilitates extra level of security as the associated code and data may be protected from more vulnerable OS side of the COTS/IoT device. This architecture guarantees better data integrity as the data cannot be modified by unauthorized or undetected users/programs. Confidential data or code may be stored in the TE, whereas, the same the confidential data or code may also me stored in the OS in encrypted form but doesn't guarantee the level of security provided by TE.

The execution of a Trusted Application (TA) in TE may affect execution of applications in OS, however, execution in the OS cannot interfere with the execution in TE. The application running on OS may request to execute code or verify tokens/keys through the TE client API. Further, the TE may execute respective TA or verify keys/tokens and provide the result to the TE client API.

In an embodiment, the COTS/IoT devices may include smart phones, laptops, computers, tablets, and smart watches, among other COTS/IoT devices known in the art.

Figure 2:
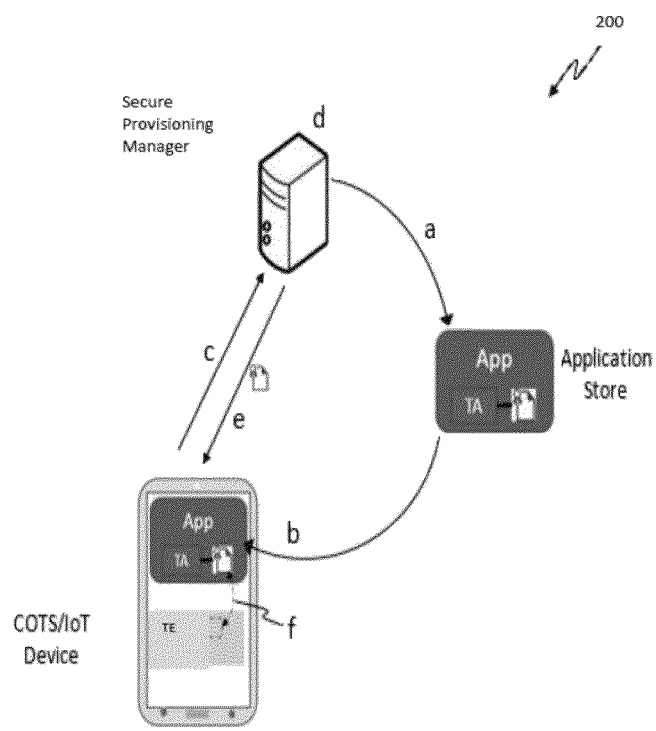
FIG. 2 is an exemplary flow diagram 200 for deploying a Trusted Application (TA) in the TE environment of the COTS/IoT device, in accordance with an embodiment of the invention.

FIG. 2 is an exemplary flow diagram 200 for deploying a Trusted Application (TA) in the TE environment of the COTS/IoT device, in accordance with an embodiment of the invention. The Secure Provisioning Manager (SPM) is a remote server configured to establish communication with the TE of the COTS/IoT device. SPM may also authorize the installation of the Trusted Application in the TE of the COTS/IoT device. SPM may further be configured to push data or other confidential keys for a TA into the TE.

The application store may a platform on which a developer/company may host their applications for download. The users of the COTS/IoT devices may download an application from the application store. The typical examples of application store may include Google Play and App Store by Apple, among others.

Referring to FIG. 2, in the flow diagram the flow 'a' indicates a developer/company involved in developing an application which is hosted in the app store. It shall be understood that, for the sake of simplicity the SPM and developer/company have been grouped into one, however it is always possible that the developer/company may be different from SPM. Also, it shall be noted that the application is signed as a Trusted Application by SPM or Manufactures before moving to SPM.

The flow 'b' indicates creating a security domain after the application is downloaded and running for the first time in the COTS/IoT device. The security domain is a place where keys can be stored, where the trusted application when at rest may be encrypted to keep safe.

Further, at flow 'c' the application requests the SPM to approve the installation of the TA in the TE. The SPM at flow 'd' may perform several checks such as verifying the identity of the COTS/IoT device, verifying whether it's a trust worthy end point, and keep a track of the number of trusted applications deployed, among others, and upon positive verification issue a token/key to authorize the installation of TA in the TE of the COTS/IoT device.

Further, at flow 'e' the TA is installed in the TE of the COTS/IoT device and is safely stored in TE. Additionally, the SPM may also share some personalisation data to the application. The identifier 'f' indicates the positively verified and installed TA loaded into the TE of the COTS/IoT device.

Figure 3:
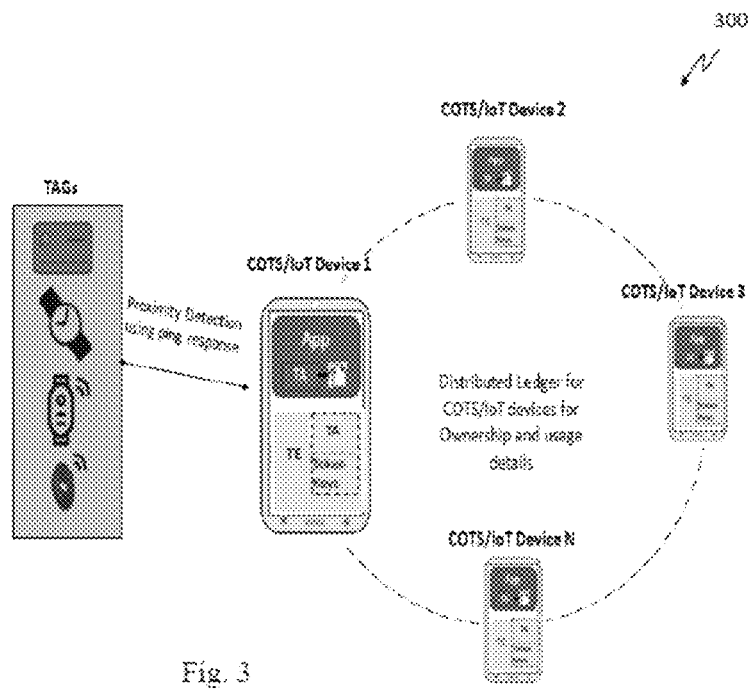
FIG. 3 illustrates an exemplary block diagram of a system 300 for secure financial transactions using a COTS/IoT device with added security by incorporating a distributed ledger among the COTS/IoT devices, in accordance with an embodiment of the invention.

FIG. 3 illustrates an exemplary block diagram of a system 300 for secure financial transactions using a COTS/IoT device with added security by incorporating a distributed ledger among the COTS/IoT devices, in accordance with an embodiment of the invention.

As illustrated in the FIG. 3 the system 300 includes an COTS/IoT device 1. The COTS/IoT device 1 includes an application for processing a secure payment by accessing a trusted application (TA) installed in the TE. The TE is isolated from the operating system of the COTS/IoT device and runs in parallel on a TE part of the processor. Further, when a tag as illustrated in the figure is bought close to the COTS/IoT device a resonance response is initiated.

In an embodiment, the tag may include, but not limited to, for example a credit card, debit card, smart watch, and a smart ring, among other devices capable of storing information pertaining to payment credentials.

In an embodiment, the resonance response may be initiated only the tag is within a predetermined distance from the COTS/IoT device. In response to the resonance response the TAG may share the information corresponding to the tag with the COTS/IoT device for processing a payment.

Figure 4:
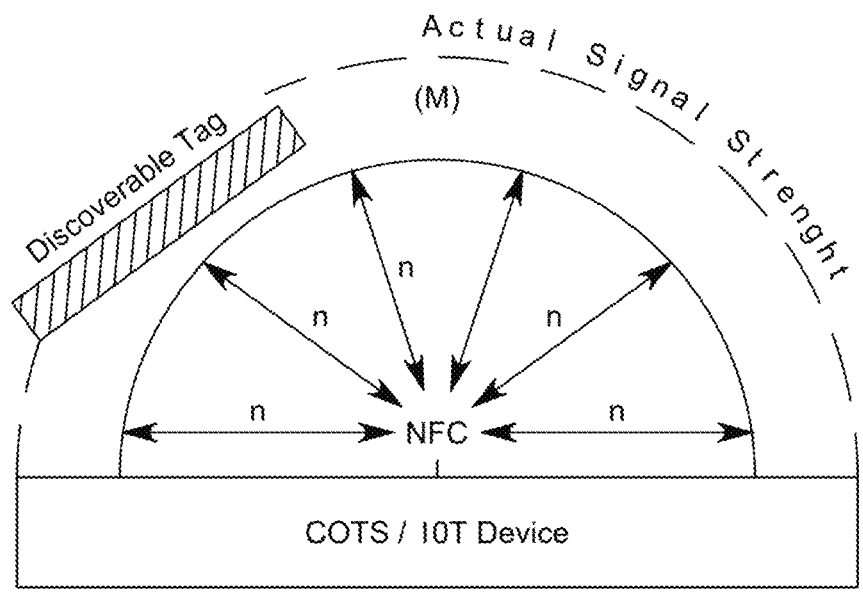
FIG. 4 illustrates an exemplary resonance response and a tag discovery, in accordance with an embodiment of the invention.

FIG. 4A illustrates an exemplary resonance response and a tag discovery, in accordance with an embodiment of the invention. As indicted in the FIG. 4 the when the TAG is within the range of the actual signal strength 'm' it may be discoverable by the COTS/IoT device. However, the information for the tag may not be accepted until the tag is within the distance of 'n' form the COTS/IoT device.

In an embodiment, the distance of the tag is continuously monitored upon its discovery. Further, in the event the distance calculated in a first resonance response is greater than the distance calculated in the second or subsequent resonance response, and the tag is within the predetermined distance from the COTS/IoT device, the tag information may be received by the COTS/IoT device. The financial transaction may be initiated thereafter.

In an embodiment, different techniques may be adapted to implement a resonance response for example, but not limited to, using one or more of light proximity, sound proximity and relative distance, among other techniques known in the art.

Referring back to FIG. 3, as illustrated the plurality of COTS/IoT devices may share a distributed ledger among themselves. This may be implemented using state-of-the-art distributed ledger technologies such as, but not limited to, Blockchain and Hash graph, among other technologies. The distributed ledger may include information corresponding to the unique identification number of the COTS/IoT device, ownership of the COTS/IoT device, usage information of the COTS/IoT device, and manufacture information of the COTS/IoT device, among other information.

The information corresponding to accessing the distributed ledger, such as the private key and other cryptos may also be stored in the TE, through an update via SPM to the TA.

This enables tracking the ownership details of the device. Further crowd leasing may also be facilitated i.e. allowing ownership of the devices via "crowd leasing" approach and genuinely identifying individual of the lease. The duration of ownership may also be recorded, and this enables distribution of return of the leasing if desired. The usage/consumption information may include, but not limited to, estimated lifespan of the device, automation of maintenance, and charging by usage, among others.

Figure 5:
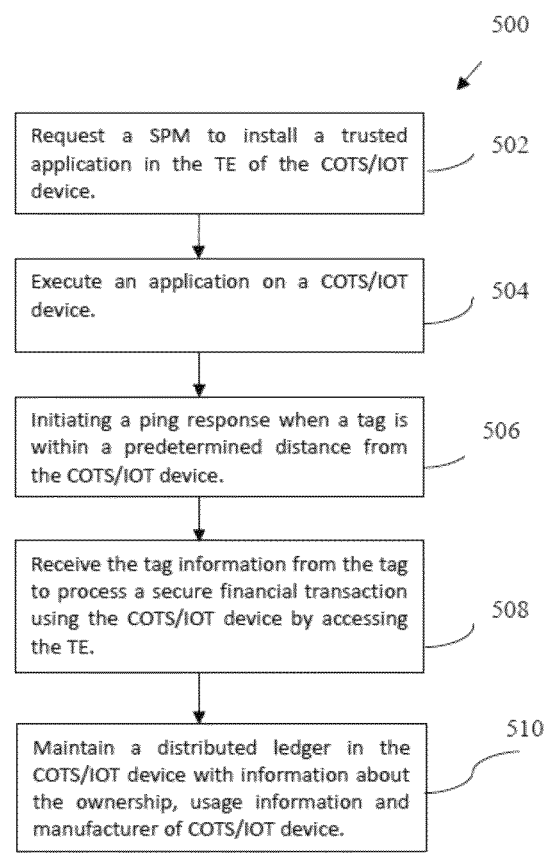
FIG. 5 is a flowchart of an exemplary method 500 for processing a secure financial transaction using a COTS/IoT device, in accordance with an embodiment of the invention.

FIG. 5 is a flowchart of an exemplary method 500 for processing a secure financial transaction using a COTS/IoT device, in accordance with an embodiment of the invention. The method 500 may be implemented in a COTS/IoT device. The COT/IoT device is embedded with a unique key during the manufacturing stage. Further, a developer application may be signed by a SPM so that the TA can be installed in the TE of COTS/IoT. At step 502 a request to install a trusted application in the TE of the COTs/IoT device may be send to the SPM. Further, upon positive verification the application may be executed on the COTS/IoT device at step 504.

Further, at step 506, a resonance response may be initiated when a tag is discovered to be within a predetermined distance from the COTS/IoT device. Thereafter, at step 508 the information from the tag is used to process a secure financial transaction using the COTS/IoT device by accessing the TE. Further, at step 510, a distributed ledger such as blockchain or hash graph may be implemented to maintain a ledger in all the COTS/IoT devices. The distributed ledger may comprise information corresponding to ownership, usage information, and manufacturer of the COT/IoT device, among other details.

In the foregoing detailed description, numerous specific details, examples, and scenarios are explained in order to facilitate a thorough understanding of the present disclosure. However, the embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation. Thus, the scope of the invention should be determined by the appended claims and their legal equivalents rather than by details, examples, and scenarios provided.

It shall be noted that the processes described above are described as sequence of steps; this was done solely for the sake of illustration. Accordingly, it is understood that some steps may be added, some steps may be omitted, the order of the steps may be re-arranged, or some steps may be performed simultaneously.

Although embodiments have been described with reference to specific example embodiments, it will be evident that various combinations, modifications, additions, and omissions may be made to these embodiments without departing from the broader spirit and scope of the foregoing disclosure and appended claims. Accordingly, the specification and drawings are to be regarded in an illustrative sense rather than a restrictive sense. It is to be understood that the phraseology or terminology employed herein is for the purpose of description and not of limitation.

What is claimed is:

1. A method (500) for processing a secure financial transaction using a Commercial off-the-shelf (COTS)/Internet of Things (IoT) device, the method comprising:
   requesting (502) by the COTS/IoT device, a Secure Provisioning Manager (SPM) to verify a device identity and download a Trusted Application (TA) in a Trusted Environment (TE) of the COTS/IoT device,
   creating a security domain after the TA is downloaded and running for a first time in the COTS/IoT device, wherein the security domain is an environment where cryptographic keys associated with the TA are stored, and where the TA is encrypted,
   wherein the TE is a secured part of the COTS/IoT device where the TA is executed, and wherein the TE is isolated from an operating system of the COTS/IoT device and is executed in parallel to the operating system of the COTS/IoT device on a TE part of a processor;

executing (504) an application on the COTS/IoT device;

determining a first distance of a tag is within a predetermined distance from the COTS/IoT device;

initiating (506) a resonance response based on the first distance being within the predetermined distance from the COTS/IoT device;

receiving (508) tag information from the tag;

determining a second distance of the tag, wherein the second distance is closer to the COTS/IoT device than the first distance; and processing a secure financial transaction using the COTS/IoT device based on the received tag information by accessing the TE, wherein processing the secure financial transaction is initiated based on the second determined distance of the tag being closer to the COTS/IoT device than the first determined distance.

2. The method (500) according to claim 1, wherein the COTS/IoT device includes a distributed ledger.

3. The method (500) according to claim 1, wherein the SPM is a remote system.

4. A Commercial off-the-shelf (COTS) or an Internet of Things (IoT) device for processing a secure financial transaction, the COTS/IoT device comprising:

a processor comprising an operating system (OS) operable to:

execute an application on the COTS/IoT device;

request a Secure Provisioning Manager (SPM) to verify a device identity and install a Trusted Application (TA) in a Trusted Environment (TE) of the COTS/IoT device, and create a security domain after the application is downloaded and running for a first time in the COTS/IoT device, wherein the security domain is an environment where cryptographic keys associated with the TA are stored, and where the TA is encrypted, wherein the TE that forms a part of the processor, is a secured part of the COTS/IoT device where the TA is executed, wherein the TE is isolated from the OS of the COTS/IoT device and is executed in parallel to the OS on a TE part of the processor;

determine a first distance of a tag is within a predetermined distance from the COTS/IoT device;

initiate a resonance response based on the determination that the first distance of the tag is within the predetermined distance from the COTS/IoT device;

receive tag information from the tag;

determine a second distance of the tag, wherein the second distance is closer to the COTS/IoT device than the first distance; and process a secure financial transaction using the COTS/IoT device based on the received tag information by accessing the TE part of the processor, wherein processing the secure financial transaction is initiated based on the second determined distance of the tag being closer to the COTS/IoT device than the first determined distance.

5. The COTS/IoT device according to claim 4, wherein the COTS/IoT device comprises a distributed ledger.

* * * * *